(12) United States Patent
Teodoriu et al.

(10) Patent No.: US 9,746,110 B2
(45) Date of Patent: Aug. 29, 2017

(54) GAS TIGHT PIPE CONNECTION OF INNER AND OUTER PIPE PARTS

(71) Applicant: voestalpine Tubulars GmbH & Co KG, Kindberg-Aumuehl (AT)

(72) Inventors: Catalin Teodoriu, Ploiesti (RO); Gernot Fritz, Krieglach (AT)

(73) Assignee: voestalpine Tubulars GmbH & Co KG, Kindberg-Aumuehl (AT)

( * ) Notice: Subject to any disclaimer, the term of this patent is extended or adjusted under 35 U.S.C. 154(b) by 0 days.

(21) Appl. No.: 15/224,483

(22) Filed: Jul. 29, 2016

(65) Prior Publication Data

US 2016/0334034 A1    Nov. 17, 2016

Related U.S. Application Data

(63) Continuation of application No. 12/995,664, filed as application No. PCT/AT2009/000219 on May 26, 2009, now abandoned.

(30) Foreign Application Priority Data

Jun. 3, 2008 (AT) ................................ A 894/2008

(51) Int. Cl.
    *F16L 15/06* (2006.01)
(52) U.S. Cl.
    CPC ................................ *F16L 15/06* (2013.01)
(58) Field of Classification Search
    CPC ........ F16L 15/06; F16L 15/004; F16L 15/009
    USPC .............................. 285/333, 332, 332.1, 334
    See application file for complete search history.

(56) References Cited

U.S. PATENT DOCUMENTS

| | | | |
|---|---|---|---|
| 3,359,013 A * | 12/1967 | Knox .................... | F16L 15/004 285/114 |
| 3,870,351 A * | 3/1975 | Matsuki ................ | E21B 17/042 285/334 |
| 4,692,988 A * | 9/1987 | Shulver ................. | E21B 17/042 285/334 |

(Continued)

FOREIGN PATENT DOCUMENTS

| | | | | |
|---|---|---|---|---|
| FR | WO 03048623 A1 * | 6/2003 | .......... | E21B 17/042 |
| GB | 2 366 844 A | 3/2002 | | |

(Continued)

OTHER PUBLICATIONS

DIN 8593 Standard, Manufacturing Process Joining, Part 3 and Part 4, dated Sep. 2003, 2 pages.

*Primary Examiner* — Jonathan Masinick
*Assistant Examiner* — James A Linford
(74) *Attorney, Agent, or Firm* — Kilpatrick Townsend & Stockton LLP

(57) ABSTRACT

A gas-tight pipe connection that has inner and outer pipe parts which when joined create a gas tight seal. The inner pipe part has a press fit surface, a stop surface, and a transition surface between the press fit surface and the stop surface. The outer pipe has an outer collar, a press fit surface, and a stop surface as well as a recess in its interior wall which extends from the press fit surface to the stop surface. When the outer pipe part is joined with the inner pipe part, the connection forms a press fit region, a stop region, and a transition region, where the transition region forms a coaxial intermediate space or hollow space.

12 Claims, 1 Drawing Sheet

(56) References Cited

U.S. PATENT DOCUMENTS

| | | | | |
|---|---|---|---|---|
| 4,958,862 A | * | 9/1990 | Cappelli | F16L 15/004 285/334 |
| 4,984,829 A | * | 1/1991 | Saigo | F16L 15/004 285/334 |
| 5,505,502 A | * | 4/1996 | Smith | E21B 17/085 285/334 |
| 6,478,344 B2 | * | 11/2002 | Pallini, Jr. | E21B 17/042 285/333 |
| 7,334,821 B2 | * | 2/2008 | Dutilleul | E21B 17/042 285/333 |
| 2001/0027867 A1 | * | 10/2001 | Gandy | E21B 17/00 166/369 |

FOREIGN PATENT DOCUMENTS

| | | |
|---|---|---|
| WO | 03/048623 A1 | 6/2003 |
| WO | 2004/023020 A1 | 3/2004 |
| WO | 2007/017082 A1 | 2/2007 |

* cited by examiner

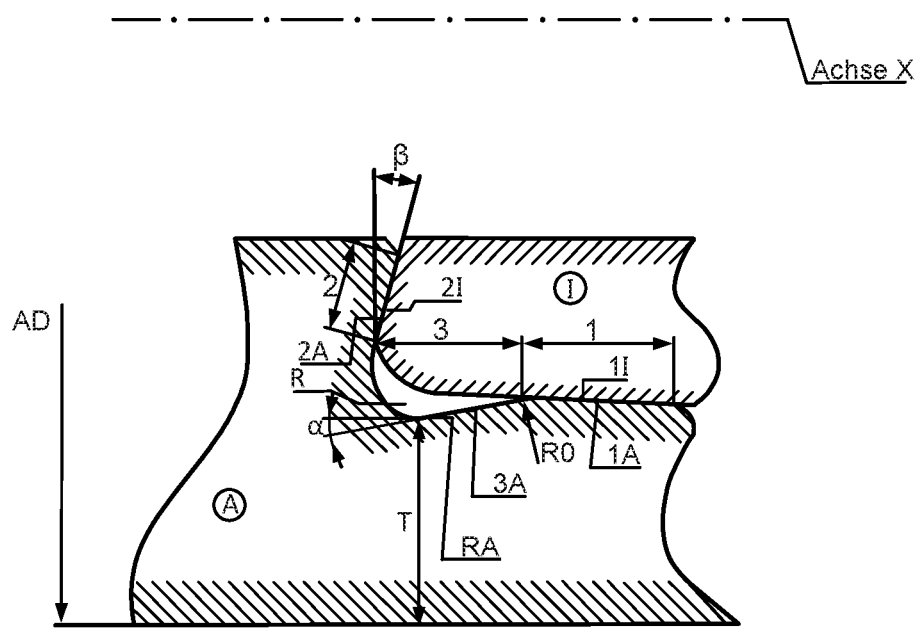

US 9,746,110 B2

GAS TIGHT PIPE CONNECTION OF INNER AND OUTER PIPE PARTS

CROSS-REFERENCES TO RELATED APPLICATIONS

This application is a continuation of U.S. application Ser. No. 12/995,664, filed Jan. 26, 2011, which is a National Stage of International Application No. PCT/AT2009/000219, filed May 26, 2009, and which claims the benefit of Austrian Patent Application No. A 894/2008, filed Jun. 3, 2008, the disclosures of which are incorporated herein by reference.

BACKGROUND OF THE INVENTION

The invention concerns a pipe connection, in particular a gas tight pipe screw connection wherein the parts in the connecting region are connected by means of joining according to DIN 8593 by way of contact-pressing and insert-pressing, comprising an inner pipe part and an outer pipe part, or two inner pipe parts with an outer collar.

Pipes, mostly seamless pipes that can be formed from different materials, are utilized for the conveyance of oil field- and/or gas field products vertically and horizontally also over large distances and require, because of the significant demands, a high sealing quality of the connections during practical operation or application.

A pipe connection that has already been utilized over the long term, and represents essentially prior art in regard to the geometric basic concepts, is designed in such a manner that an inner pipe part and an outer pipe part features sealing surfaces that are truncated cone shaped and abut against one another, with an inclination toward one another in the distal direction of the inner pipe part of about 1:10, and that act together with stop surfaces that are truncated cone shaped and are aligned opposite the axis direction. A sealing effect can thereby be achieved by means of a mutual, axial contact-pressing (fully engaged) of the pipe endings for example by means of a thread connection or similar.

In order to improve the tightness or the quality of the pipe connection in the case of the demands on the pipe lines present in the field, but also to achieve in the case of a dismantling and reassembling of the pipe components maintenance of the sealing quality of the pipe connections, a plurality of geometric embodiment forms have already been proposed with particular design of the seal- and stop surfaces of the connection. Complex sealing surface shapings are however usually associated with higher expenditures for the chip-removing processing of the connecting regions of the pipe endings and with lowered cost effectiveness of manufacture.

The U.S. Pat. No. 7,334,821 B2 discloses a pipe connection with a barrel-shaped sealing surface of the pipe inner part that is convex in cut, followed by a protruding extension with a distal stop surface. Thereby, during full engagement of the pipe connection, the press surfaces of the pipe components are to obtain a higher conicity and achieve an improved sealing effect. The manufacturing effort for the construction of the complex shaped sealing regions appears however to be high.

BRIEF SUMMARY OF THE INVENTION

Building on the essential geometric concepts of a pipe connection according to prior art it is the object of the invention to indicate, while providing high cost effectiveness of the manufacturability, a novel pipe connection that effects improved usage characteristics of the pipe lines in practical field applications and is beneficial for a dismantling and a reassembly of pipes.

The improved usage characteristics of the pipe lines concern in particular the maintenance of the seal tightness of the respective pipe connections in the case of high interior pressure as well as in the case of high external pressure, as well as overlaying tensile-, pressure-, and bending-load of the pipe strand, whereby so-called seizing symptoms in the connecting region are minimized and a release and a renewed full engagement of the connection is to be improved.

The posed problem is solved according to the invention by means of a pipe connection of the type mentioned above in that the connection is implemented with three regions, wherein the connecting regions comprise press fit and stop of the pipe parts or press fit surfaces that cooperate with the pipe parts and collar and that have a truncated cone shape and that are inclined in the end direction from the inner pipe part toward the pipe axis, and at the front comprise stop surfaces, which have a truncated cone shape and are directed counter to said press fit surfaces and a transition from press fit and stop of the parts that are connected is provided for said parts without contact with a coaxial intermediate space or hollow space.

The advantages achieved with the invention are, acting together, essentially an increase of the surface pressure on the press fit surfaces and an advantageous positioning of said surfaces spaced apart from the stop surfaces. Associated with that is a general optimization of the size of the local, mechanical material stress in the connecting region and an avoidance of tension spikes in respect to the appearance of plastic deformations and the initiation of tears in the material.

By means of extensive investigations it was determined that the sealing characteristics of the pipe connections according to the invention are completely maintained during pressures beyond the nominal and during overlaying tensile-, pressure-, and bending loads.

Calculations according to the FE method as well as elasticity determinations have established that through a geometry according to the invention in the connecting region and namely with the implementation of a hollow space between press fit- and stop surfaces a plurality of advantages is achieved.

For one, the press fit- and sealing fit surfaces are shortened or reduced by means of the hollow space at, relative to prior art, the same longitudinal extent of the connection, which leads to higher sealing surface pressures.

The transition that is implemented contact-free provides load-kinetically an elevated, largely homogeneous, specific surface pressure and thereby the sealing at the press fit surfaces, wherein, because of an axial spacing apart relative to the stop surfaces, only tolerable differences in the local surface pressure are created in the case of a bending of the system. Overlaying tensile stresses and pressure tensions, if applicable, have only a negligible effect on the sealing of the connection because the press fit surfaces feature a slight inclination of about 1:10.

Advantageously the hollow space in the connecting region of the pipe parts acts as a greasing means pocket and improves the distribution and lowers the pressure of the grease material during the sealing assembly of the field pipeline.

If, according to a preferred embodiment of the invention the transition between the pipe parts, that is produced without contact of the connecting region's press fit and stop, is formed by means of a coaxial recess from the interior wall surface of the outer pipe part, optimal mechanical material stresses as well as also tension states that promote the sealing of the connection are achieved.

During the insert-pressing of the inner pipe part into the outer pipe part in the case of a complete engagement setting of the connection, significant, primarily radially oriented forces are created in the region of the press fit surfaces that leads in this region to an expansion with a tangential, elastic stretching of the material of the outer pipe wall.

By means of a coaxial recess on the interior wall surface of the outer pipe part in the following transition region, and therefore a contact removal of the pipe parts in the region up to the stop surfaces, no elastic stretchings of the outer pipe wall in the tangential direction are provided, however axially directed tensional forces act in said region that come to bear, by means of a press-on of the stop surface of the inner pipe, on those of the outer pipe and produce an elastic stretching in the axial direction.

In the connecting region local complex tension states are thereby largely reduced according to the invention, wherein according to the invention the implementation of the transition region produces larger, elastic stretching values and assures the seal tightness of the connection even in the case of complex demands on the pipe strand.

In an optimal way the recess in the transition region features in its cross section a corner-free profile because as a result tension spikes on the interior surface of the outer pipe part are largely avoided and the initiation of tears and the danger of a breach is eliminated.

If the inner pipe part is implemented in a rounded manner in the region of the transition from the distally continued press fit surface to the stop surface, then local tension spikes can be eliminated with local plastic material deformations and the cooperation of the stop surfaces can be improved. Particularly good results were achieved with an edge rounding with a radius of $R_c$=0.9 to 1.5 mm or for TUBINGS of $R_\tau$=0.2 to 0.6 mm.

It is advantageous if the coaxial recess is implemented in the outer pipe part in the cross section of the press fit surface with a transition radius of 0.5 to 1.0 mm and is shaped up to the stop surface edge-free. Thereby pressure tension spikes are assuredly avoided in the border region of press fit surface and recess.

Extensive and specific investigations have revealed that the quotient of the length of the transition that is implemented without contact to the length of the effective press fit should have in an optimal sense a value of 0.4 to 1.7, preferably of 0.6 to 1.5, in order to achieve optimal sealing conditions of a pipe connection according to the invention.

This apparently broad value range was obtained from an inclusion of all common pipe diameters.

Dimensionally-related evaluations revealed that the quotient, for pipes that are so-called casings with an outer diameter of larger than 4½ inches, is optimized around 0.4 to 1.2, preferably around 0.6 to 1.0.

On the other hand, for riser or conveying pipes that feature an external diameter of smaller/equal 4½ inches to about 1.66 inches and lower, i.e. in the case of so-called tubings, optimized quotients of length of the transition that is implemented without contact to the length of the press fit were determined to be 0.9 to 1.7, preferably 1.1 to 1.5.

In order to achieve an optimal and high-value compact embodiment form of the pipe connection with increased seal tightness, the outer pipe part should feature an inclination of the press fit surface of about 1:10 relative to the diameter of the stop surfaces, and the stop surface should feature, oriented oppositely, an angle beta of $\beta$=10° to 20°, preferably of $\beta$=about 15° relative to the axis normal.

If, as experiments have revealed, the press fit surfaces and/or the stop surfaces feature a surface roughness of less than Ra=3.2 µm, however more than Ra=0.4 µm measured as a mean roughness value according to DIN 4777 ISO/DIN4287/1, then a high specific pressure load is applicable without a so-called seizure of the press fit surfaces and a largely unrestricted dismantling of the pipe connection is possible. It is assumed in this regard that in the depressions of the rough surface profile in the upper roughness limits an optimal greasing means amount can be positioned in order to achieve the desired properties.

Effect-related the pipe connection according to the invention can be placed in full engagement through different means that press the pipe parts axially together. The known screw connections have proven themselves to be advantageously effective.

BRIEF DESCRIPTION OF THE DRAWING

By means of a schematic illustration only one embodiment form of a pipe connection according to the invention is to be represented in what follows.

It is shown:

FIGURE: a pipe connection in an axial cut.

In the FIGURE a pipe connection of an inner pipe I and an outer pipe A is shown in an axial cut.

DETAILED DESCRIPTION OF THE INVENTION

In the connecting region of the pipes the inner pipe part I features a frustoconical surface with a press fit surface 1I that are, in reference to the pipe diameter, inclined distally at a value of 1:10. Following the press fit surface 1I distally a stop surface 2I is shaped that is inclined toward the pipe's longitudinal axis x at an angle $\beta$ of 15° in an oppositely oriented manner and that represents a stop 2 with a sealing surface on the front and the inner pipe end.

A outer pipe part A abuts in the case of a completely engaged pipe part connection in the connecting region 1 proximal against the press fit surface 1I of the inner pipe with the press fit surface A1.

Between the connecting region 1, which encompasses the press fit surfaces 1I and 1A, and the region 2 with the stop surfaces of the pipe parts there is a transition region 3 provided in which a recess RA from the interior wall of the outer pipe A is present, a hollow space R is formed between the pipe parts I and A and the parts in this zone (transition region 3) are placed without contact.

In the outer pipe part A the border region between press fit surface 1A and recess profile 3A is rounded with a radius of 0.8 mm, wherein in what follows the entire interior wall surface 3A of the coaxial recess RA up until the stop surface 2A is implemented in an edge-free rounded manner.

It will be appreciated that the pipes I and A are generally cylindrical, rotated about the axis x in the FIGURE. Therefore, the connecting region 1 and the stop region 2 are respective lateral surfaces of frusta of right circular cones, each being the rotation of the illustrated surface 1, 2 about the axis x.

What is claimed is:

1. A gas-tight pipe screw connection assembly having a longitudinal axis along its length and a normal axis perpendicular to the longitudinal axis, comprising:

an inner pipe part having a first part being a first press fit surface, a second part being a first stop surface, and a transition surface extending between the first press fit surface and the first stop surface, and an outer pipe part having an interior wall, an outer collar, a second press fit surface having a first angle relative to the longitudinal axis and extending from a radius away from the first stop surface along the length of the outer pipe part, a second stop surface having a second angle relative to the normal axis and being different from the first angle, and an annular recess in said interior wall having a tapered region with a third angle relative to the longitudinal axis different than the first angle and second angle, the tapered region having a greater diameter extending radially outward into the outer pipe part than the radius, and the tapered region extending from the radius to a smooth, continuous, curved, concave portion, wherein the concave portion extends from the tapered region to the second stop surface, such that the annular recess encircles the longitudinal axis, protrudes outward from the longitudinal axis, and extends radially outward beyond the second press fit surface, wherein, when the outer pipe part is joined with the first inner pipe part and the second inner pipe part, connected by contact-pressing and insert-pressing, to form a connection region, the connection region is established from three regions configured to preserve the seal of the pipe connection for superimposed tension, pressure and, in particular, bending stresses of the pipe string, comprising:

a press fit region, defined by the abutment of the first press fit surface and the second press fit surface having a truncated cone shape, wherein the press fit region is a lateral surface of a frustum of a right circular cone which is inclined in the direction from the inner pipe part toward the inner pipe axis, a stop region, defined by the abutment of the first stop surface and the second stop surface having a truncated cone shape, wherein said stop region is an additional lateral surface of an additional frustum of an additional right circular cone, the second stop surface configured counter to said press fit region, and a transition region extending from the press fit region to the stop region and defined by the inner pipe part transition surface and the recess, in which the transition surface extends into the annular recess of the outer pipe part without contact occurring between the inner pipe part transition surface and the annular recess in said interior wall from the tapered region to the second stop surface, said transition region forming a coaxial intermediate space or hollow space, wherein the quotient of the length of the transition region to the length of the press fit region is from 0.4 to 1.7, wherein second press fit surface is inclined at a ratio of substantially 1:10 relative to the diameter, wherein the first and second press fit surfaces and/or the first and second stop surfaces feature a surface roughness of between Ra=3.2 μm and Ra=0.4 μm, and wherein the second stop surface is angled from between 10° to 20°, relative to the normal axis.

2. The pipe connection assembly according to claim 1, wherein the recess in the transition region has no edges when viewed in cross section.

3. The pipe connection assembly according to claim 1, wherein the inner pipe part is shaped in a rounded manner in the transition region by the press fit surface and stop surface.

4. The pipe connection assembly according to claim 1, wherein the recess has a transition radius of 0.5 to 1.0 mm.

5. The pipe connection assembly according to claim 1, wherein the connection is for pipes with an outer diameter greater than 4½ inches, and the quotient of the length of the transition region to the length of the press fit region is from 0.4 to 1.2.

6. The pipe connection assembly according to claim 1, wherein the connection is for pipes with an outer diameter of 4½ inches or smaller, and the quotient of the length of the transition region to the length of the press fit region is from 0.9 to 1.7.

7. The pipe connection assembly according to claim 1, wherein the inner and outer pipe are thermally treated or hardened at least in the connecting region and features an increased strength.

8. The pipe connection assembly of claim 1 wherein the recess is corner free.

9. The pipe connection assembly according to claim 1, wherein the quotient of the length of the transition region to the length of the press fit region is from 0.6 to 1.5.

10. The pipe connection assembly according to claim 9, wherein the quotient of the length of the transition region to the length of the press fit region is from 0.6 to 1.0.

11. The pipe connection assembly according to claim 10, wherein the quotient of the length of the transition to the length of the press fit region is from 1.1 to 1.5.

12. The pipe connection assembly according to claim 1, wherein the outer pipe part second stop surface angle is 15° relative to the normal axis.

* * * * *